US009617981B2

(12) United States Patent
Hancock

(10) Patent No.: US 9,617,981 B2
(45) Date of Patent: Apr. 11, 2017

(54) WIND TURBINE BLADE BEARING REMOVAL APPARATUS AND METHOD

(75) Inventor: Mark Hancock, Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 842 days.

(21) Appl. No.: 13/978,463

(22) PCT Filed: Dec. 19, 2011

(86) PCT No.: PCT/GB2011/052517
§ 371 (c)(1),
(2), (4) Date: Sep. 12, 2013

(87) PCT Pub. No.: WO2012/093245
PCT Pub. Date: Jul. 12, 2012

(65) Prior Publication Data
US 2014/0010661 A1 Jan. 9, 2014

Related U.S. Application Data

(60) Provisional application No. 61/430,651, filed on Jan. 7, 2011.

(30) Foreign Application Priority Data

Jan. 7, 2011 (GB) .................................. 1100260.7

(51) Int. Cl.
*F03D 80/50* (2016.01)
*F03D 80/00* (2016.01)
(Continued)

(52) U.S. Cl.
CPC .......... *F03D 80/50* (2016.05); *F03D 1/0658* (2013.01); *F03D 80/00* (2016.05); *F03D 80/70* (2016.05);
(Continued)

(58) Field of Classification Search
CPC .... F03D 1/003; F03D 1/0658; F03D 11/0008; F03D 1/001; F03D 80/70; F03D 80/00;
(Continued)

(56) References Cited

U.S. PATENT DOCUMENTS

| 5,354,175 A | 10/1994 | Coleman et al. |
| 5,660,527 A | 8/1997 | Deering et al. |

(Continued)

FOREIGN PATENT DOCUMENTS

| NL | WO 2009128708 A2 * | 10/2009 | ............. B66C 23/18 |
| WO | 2009128708 A2 | 10/2009 | |

OTHER PUBLICATIONS

European Patent Office, International Search Report and Written Opinion issued in International Application No. PCT/GB2011/052517 dated Mar. 26, 2012.

(Continued)

*Primary Examiner* — Craig Kim
*Assistant Examiner* — Brian P Wolcott
(74) *Attorney, Agent, or Firm* — Wood Herron & Evans LLP

(57) ABSTRACT

The invention relates to a wind turbine blade bearing removal apparatus and method for facilitating the changeover of the blade root bearing assembly (58) of a wind turbine blade (54). A plurality of support shoulders or yokes (60) are located on the hub (50) of the wind turbine rotor and provide attachment points for respective actuators (62). Corresponding attachment points (66) are provided in the wind turbine blade (54) via a blade support (section 64), which is constructed in the blade between the blade root bearing assembly (58) and the tip. The actuators (62) are mounted between the hub (50) and the blade root bearing assembly (58) and therefore support the blade (54) in a suspended position when the bearing is to be retained. The (Continued)

actuators (62) allow the blade to be easily reattached to the hub (50) when the blade root bearing replacement is completed.

23 Claims, 8 Drawing Sheets

(51) Int. Cl.
F03D 80/70 (2016.01)
F03D 1/06 (2006.01)
(52) U.S. Cl.
CPC ..... *F05B 2240/50* (2013.01); *F05B 2260/507* (2013.01); *F05B 2270/604* (2013.01); *F05B 2270/605* (2013.01); *Y02E 10/721* (2013.01)
(58) Field of Classification Search
CPC ..... F03D 80/50; Y02E 10/721; Y02E 10/722; F05B 2260/507; F05B 2270/604; F05B 2270/605; F05B 2240/50
See application file for complete search history.

(56) References Cited

U.S. PATENT DOCUMENTS

| | | |
|---|---|---|
| 2006/0151767 A1 | 7/2006 | Wobben |
| 2006/0228220 A1* | 10/2006 | Wobben .................. F03D 1/001 416/244 R |
| 2007/0154317 A1* | 7/2007 | Cairo .................... F03D 1/0658 416/230 |
| 2010/0028152 A1* | 2/2010 | Numajiri ................ B66C 1/108 416/146 R |
| 2010/0135797 A1* | 6/2010 | Nies ........................ F03D 1/003 416/9 |
| 2010/0158661 A1 | 6/2010 | Dawson et al. |
| 2010/0254813 A1 | 10/2010 | Dawson et al. |

OTHER PUBLICATIONS

Intellectual Property Office, search and examination report issued in GB1100260.7 dated May 5, 2011.

* cited by examiner

WIND TURBINE BLADE BEARING REMOVAL APPARATUS AND METHOD

This invention relates to wind turbines, and in particular to a wind turbine blade bearing removal apparatus and method for facilitating the change-over of the blade bearing segment of a wind turbine blade.

FIG. 1 illustrates a wind turbine 1, comprising a tower 2 on which a nacelle 3 is mounted. At least one turbine blade 5 is mounted on a hub 6 to form a rotor 4. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm. In the latter case, the diameter of the rotor may be as large as 150 meters or more.

A rotor blade is shown in more detail in FIG. 2, to which reference should now be made. The blades 5 comprises a reinforced spar 21 that runs along the length of the blade from the blade root 22 to the blade tip 23. Blade shells 24, made out of a composite fibre material, are attached to the spar and provide an aerodynamically shaped blade surface, causing the blade to experience a lifting force as the wind passes across the blade surface. The blade root section of the blade 22 is typically circular in cross section and is provided with a circular blade bearing ring 25, made of steel or other suitable material, for attachment to a corresponding circular bearing ring on the hub 6.

This is shown in more detail in FIGS. 3 and 4 to which reference should now be made. In FIG. 3, the hub is viewed in elevation from the front. Three wind turbine blades 5 are shown as attached to the hub via the blade root bearing assembly 25. In FIG. 4, the corresponding circular bearing ring on the hub 6 is shown in a side elevation view. In practice, the blade root bearing assembly 25 comprises one or more blade bearing rings, at least one of which is coupled to the hub circular bearing ring 26 by fasteners such as bolts retained in bolt holes 27.

In larger scale wind turbines, the blades can approach 100 m in length, and weigh as much as several tens of tonnes. The weight of the blade is therefore borne entirely by the blade root bearing assembly 25, the corresponding circular bearing ring 26 on the hub 6, and the fastening means. Although, these elements are constructed to withstand a great deal of operational loading and strain, it is occasionally necessary to release the connection between the blade 5 and the hub 6 for maintenance and repair. In particular, it can often be necessary to replace the blade root bearing assembly 25, with a new part.

Due to the weight of the blades and the location of the blades at the top of tall wind turbine tower situated in windy locations, connecting and disconnecting the blades from the hub can be a cumbersome process. A crane can be used to support the blade, while an engineer working in the hub releases the fasteners between the blade root bearing assembly 25 and circular bearing ring on the hub 6. However cranes are expensive and time consuming to use. Additionally, there is a problem that, once detached from the wind turbine hub 6, a blade 5 is susceptible to buffeting from the wind and if in use with a crane can be set in vibration.

We have therefore appreciated that there is a need for an improved mechanism for releasing the blade from the blade hub so that maintenance work can be carried out in the blade root bearing assembly 25, or the hub 6 and connecting bolts.

SUMMARY OF THE INVENTION

The invention is defined in the independent claims to which reference should now be made. Advantageous features are set forth in the dependent claims.

An embodiment of the invention provides a wind turbine blade comprising: a blade body, having a blade root portion and a blade tip portion; a blade support section connected to the blade root portion, wherein the blade support section comprises: attachment points for mounting a plurality of actuators between the blade and the rotor hub of a wind turbine at which the blade is attached; a support structure for reinforcing the blade root portion in the vicinity of the one or attachment points such that the blade can be suspended by the plurality of actuators and the blade support section, from a wind turbine rotor hub.

Blade root bearing replacement can therefore be carried out in a more secure, straightforward fashion, as the blade can remain mounted on the hub while the blade root bearing assembly is repaired or replaced. As a result, the process does not require a large crane to carry the blade, leading to reduced costs and easier scheduling of repair operations. The plurality of actuators allows heavy blades to be worked upon, as well as providing stability of the blade when it is detached from the hub.

The attachment points may be located on the external surface of the blade body, so that the actuators can be easily attached and removed when desired, and so that the spacing of the actuators around the periphery of the blade can be used to create clearance facilitating the removal of the blade root bearing assembly. The attachment points may support the actuators at an angle relative to the blade surface in order to increase the clearance.

In one embodiment, the support structure is an annular flange connected to the end of the blade body at the blade root portion, and the blade support section has a plurality of connectors for making a secure, releasable connection to a blade root bearing assembly. The flange provides a robust anchor portion for supporting the weight of the blade body.

In one embodiment, the support structure comprises a frame member comprising a plurality of reinforcing spokes connected within the internal circumference of the blade body in the blade root portion. This provides internal support for the actuator attachment points which may be located on the exterior of the blade surface. The reinforcing spokes may terminate at a reinforced central hub for extra support.

At least one or more of the reinforcing spokes may connect to the inner surface of the blade body internally of the location where the attachment point brackets are situated. In this way the load placed on the blade by the actuator can be transmitted most effectively to the support structure and damage to the blade can be avoided. With this in mind, the at least one or more of the reinforcing spokes may be connected by a fastener to an attachment point bracket.

The blade support section may also comprise a reinforcing brace having one or more radial tie arms for providing a cable attachment point.

In one embodiment, the attachment points are located towards one side of the blade support section such that the other side of the blade support section is substantially free from attachment points. This allows the blade root bearing assembly, once detached from the blade support section, to be slid out to one side of the blade during the repair process past the supporting actuators.

Advantageously, the attachment points are all located within a 180 degree arc around the circumference of the blade support section, as this leaves one side of the blade support section open for removing the blade support section.

More advantageously, the attachment points are all located within a 200 degree arc around the circumference of the blade support section, as this leaves one side of the blade support section open for removing the blade support section, while providing a more stable arrangement of actuators.

The blade support section may comprise three attachment points for attaching three actuators for stability.

In one embodiment, the blade support section comprises a reinforcing brace, located within the circumference of the annular flange. This strengthens the blade support section to make it more capable of bearing the weight of the wind turbine blade, when the blade is suspended from the hub, as well as any additional loading or strain resulting from the incident wind.

The reinforcing brace may comprise reinforcing members that span from one attachment point location to another within the inner circumference of the blade support section. In this way, reinforcement is provided at the points on the ring where most of the load is carried.

In one embodiment, the reinforcing brace comprises a cable attachment point. This allows the blade to be lifted into position for reattachment to the hub by means of a cable attached to the brace. The other end of the cable may be attached to a crane or a winch.

The reinforcing brace is preferably positioned within the blade support section such that when a cable is attached to the cable attachment point, the blade adopts a tilted angle with respect to the tower, facilitating the connection of the blade root bearing assembly to the wind turbine hub.

In a further embodiment, the invention provides a wind turbine blade-hub support apparatus, comprising: the wind turbine blade discussed above; one or more attachments points provided on the wind turbine rotor hub, wherein each respective attachment point corresponds to a respective attachment point on the blade support section; and one or more actuators mounted between one of the one or more attachment points on the hub and the corresponding attachment point on the wind turbine blade, the one or more actuators having an actuated position in which they supports the wind turbine blade in a separated position from the wind turbine rotor hub.

The actuator may be a hydraulic or pneumatic ram.

The invention also provides a method of replacing a blade root bearing assembly in a wind turbine, in which at least one wind turbine blade is connected to a wind turbine rotor hub via a blade root bearing assembly, the wind turbine blade having a blade support section located at the blade root portion of the blade comprising attachment points for mounting a plurality of actuators between the blade and the rotor hub of the wind turbine at which the blade is attached, and wherein one side of the blade support section is left substantially free of attachment points; the method comprising: attaching a plurality of actuators between the respective attachment points on the wind turbine rotor hub, and on the blade support section; releasing the connection between the wind turbine rotor hub and the wind turbine blade root bearing; activating the one or more actuators to separate the wind turbine blade root bearing from the wind turbine hub; removing the blade root bearing assembly while the blade is suspended from the hub on the one or more actuators, through the one side of the blade support section that is left substantially free of attachment points.

The method may further comprise activating the actuators to draw the wind turbine blade into contact with the wind turbine rotor hub such that the blade can be connected to the wind turbine rotor hub, or drawing the wind turbine blade into contact with the wind turbine rotor hub such that the blade can be connected to the wind turbine rotor hub using a cable attached to a brace section provided on the wind turbine blade.

BRIEF DESCRIPTION OF THE DRAWINGS

Embodiments of the invention will now be described, by way of example only, and with reference to the accompanying drawings, in which.

DETAILED DESCRIPTION OF THE PREFERRED EMBODIMENTS

Figure 1:
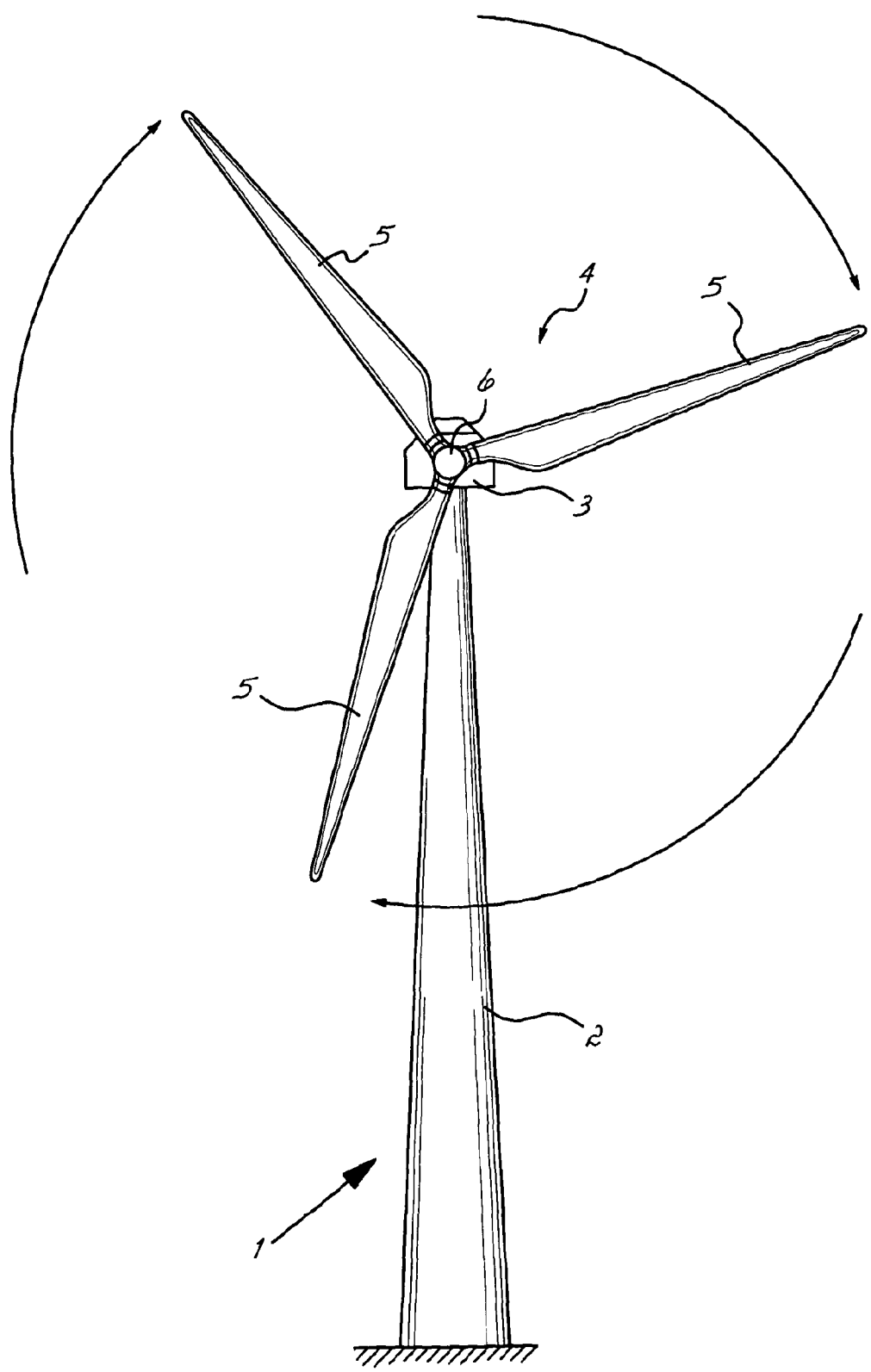
FIG. 1 is a front view of a horizontal axis wind turbine.
Figure 2:
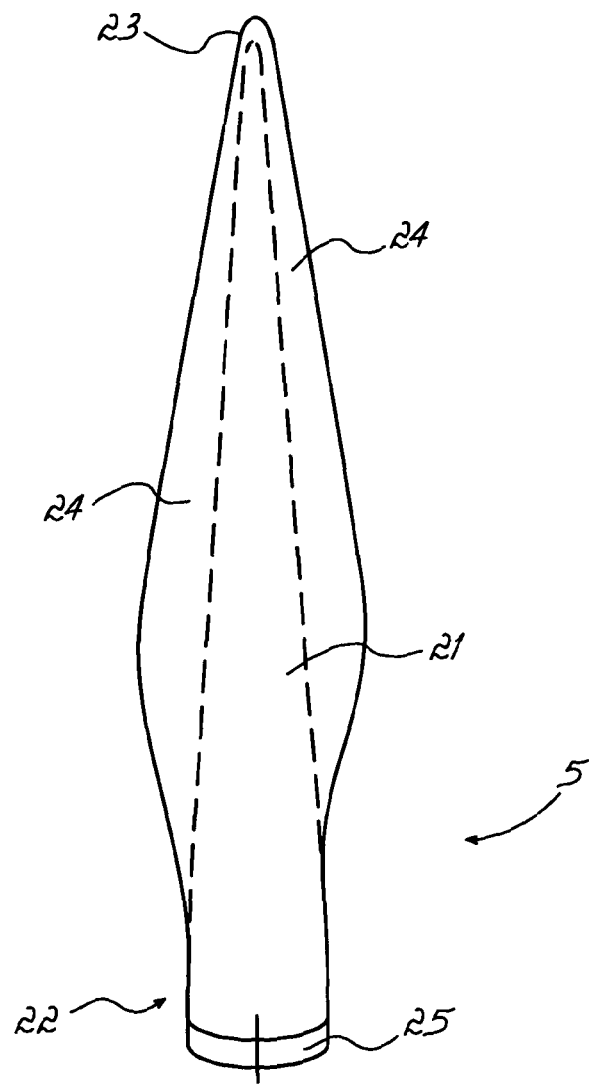
FIG. 2 is an elevation view of a wind turbine blade.
Figure 3:
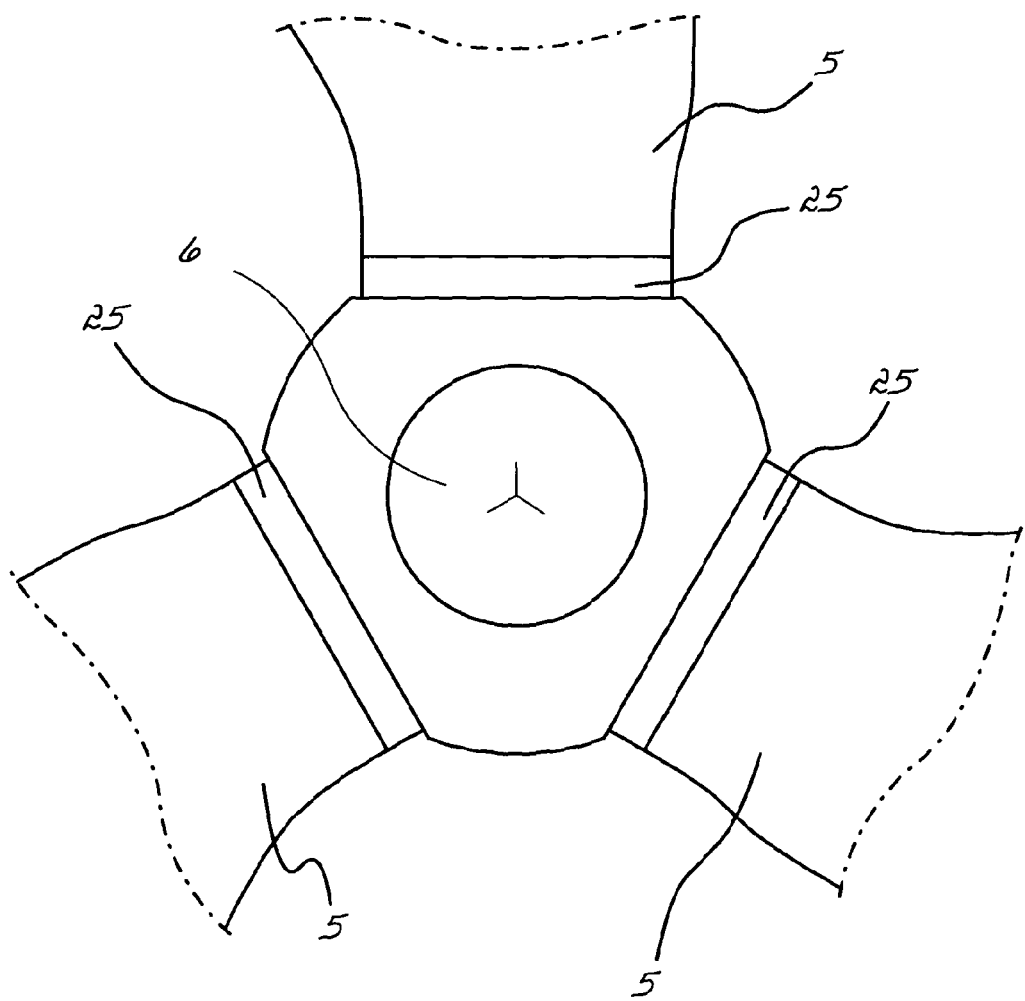
FIG. 3 is a front elevation view of the wind turbine hub showing the attachment of the blade root and blade root bearing assembly.
Figure 4:
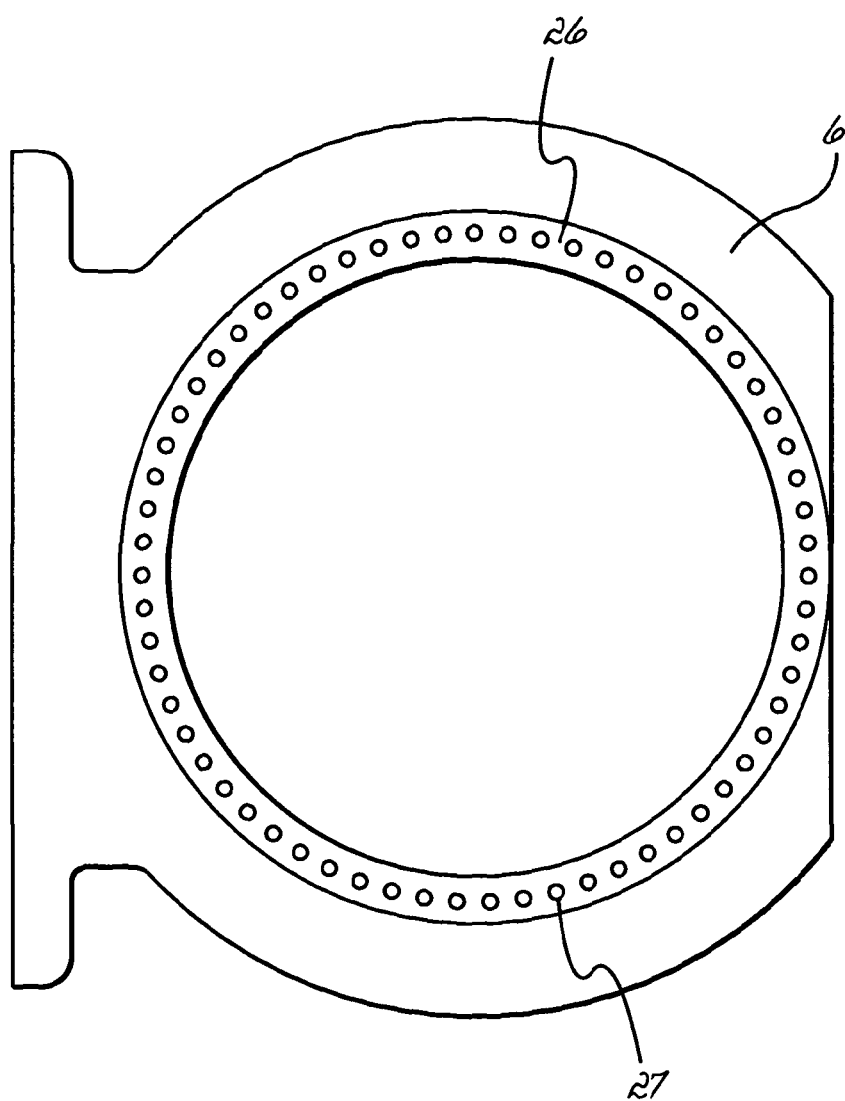
FIG. 4 is a side elevation view of a wind turbine hub showing the connection point for a wind turbine blade root bearing assembly.
Figure 5:
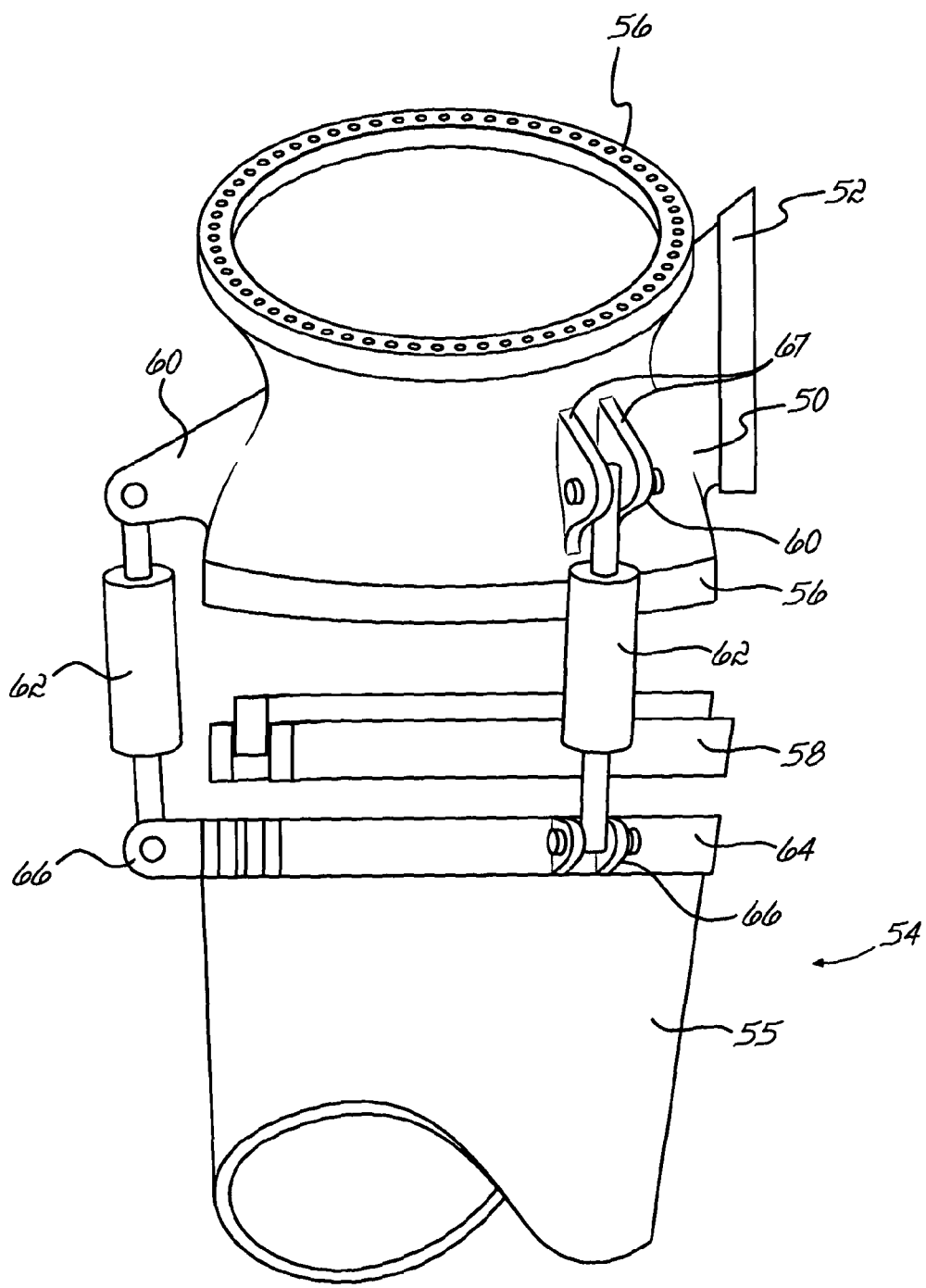
FIG. 5 illustrates an example of the invention permitting a blade to be detached from the hub for blade bearing replacement.

The invention relates to a blade-hub support apparatus that permits blade root bearing replacement for maintenance or repair. FIG. 5 illustrates the apparatus in a side view.

The hub 50 of the wind turbine rotor is attached to the nacelle of the wind turbine (not shown) by hub bearing ring 52. Rotor blades 54 are attached to respective hub blade bearing rings 56 by means of their respective blade root bearing assemblies 58. In this view, a rotor blade 54, a blade root bearing assembly 58 and the hub 50 are shown as detached from one another, as they would be if the blade root bearing assembly were being replaced.

The hub 50 bears one or more hub support shoulders or yokes 60 spaced around the circumference of the hub blade bearing rings 56 where the blades 54 are attached. Each hub support shoulder 60 provides a point of attachment for one end of a releasably securable actuator 62, such as a hydraulic or pneumatic ram, or an electrical or mechanical actuator for example.

The blade 54 comprises a blade body section 55 and a blade support section 64, attached between the blade body 55 and the blade root bearing assembly 58. The end of each actuator 62 that is not attached to a hub support shoulder 60 is attached to the blade support section 64 at a corresponding blade support section support shoulder 66.

The actuators 62 can be coupled to the support shoulders on the hub 50 and the blade support section 64 by a suitable fastener, such as a retaining bolt or screw. In this example, each support shoulder 60 or 66 comprises a pair of metal buttress plates 67 having a hole defining an axis for receiving a fastener. A retaining bolt can be threaded through the holes in the buttress plates 67, and though a corresponding hole in the end of the actuator 62 to secure it in place.

Figure 6:
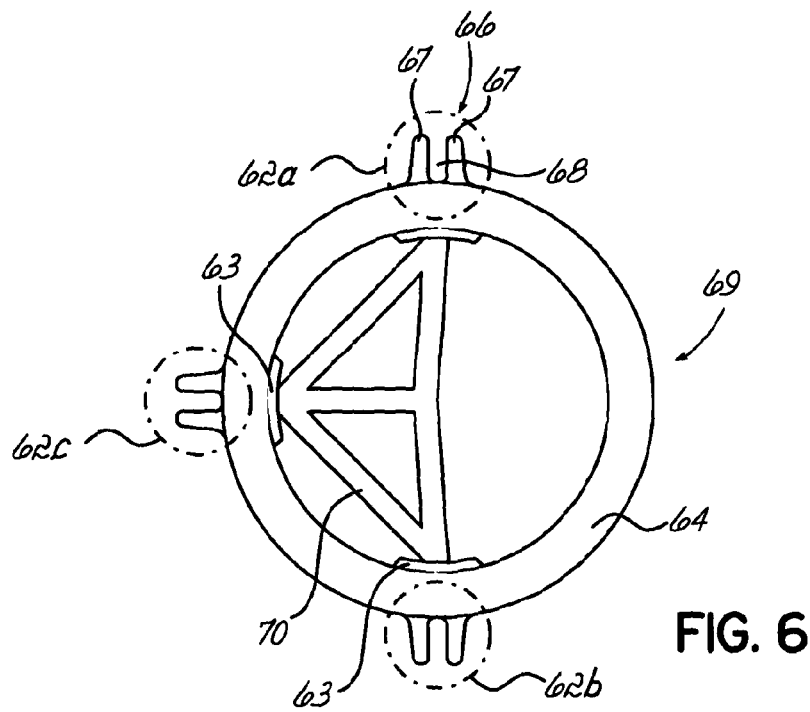
FIG. 6 illustrates the blade support section according to a first example of the invention.

The blade support section is shown in FIG. 6 to which reference should now be made. The blade support section 64 is a reinforced steel or metal ring around the periphery of which the blade support section support shoulders 66 are formed. As noted above, each blade support section support shoulder 66 comprises a pair of buttress plates 67 defining an intermediate space 68 in which one end of the actuator 62 can be positioned and secured. In FIG. 6, three blade support section support shoulders 66 are shown, separated from one another by an angular displacement of just over 90 degrees. The position of the actuators 62 is illustrated in FIG. 6 by the dotted lines shown around each support shoulder 66.

Due to the separation of the shoulders 66, one side 69 of the blade support section 64 is left without a support shoulder or actuator 62. As will be appreciated from FIG. 5, this means that in use the side 69 of the blade support section is open, and that is there is a space between the actuators 62 at positions 62a and 62b, through which the blade root bearing assembly 58 can be inserted or removed during maintenance.

The circumference of the blade root bearing assembly 58 is essentially the same as that of the blade support section 64, excluding the additional circumference due to the buttress plates 67. This means that attachment of the actuators 62 to the buttress plates at a position 62a, 62b or 62c, slightly outside of the outer circumference of blade support section 64 provides clearance between the outer circumference of the blade root bearing assembly 58 and the circumference defined by the position of the actuators 62 around the perimeter of the blade support section 64. With this in mind, it is worth noting an angular separation of 90 degrees between the attachment positions 62a, 62b and 62c would allow for optimal clearance between the blade root bearing assembly 58 and the actuators as the blade root bearing assembly 58 is inserted into or removed from position. However, as the optimal positioning for stability of three actuators 62 would be a triangular configuration, that is an equal separation between all three actuators 62, it is preferred if the separation between at least two of the actuators, in this cases 62a and 62c, and 62b and 62c is more than 90 degrees (thus, the angular separation between positions 62a and 62b is slightly less than 180 degrees). In other words, in this example, the attachment points for the actuators are all located within a 180 degree arc, or more advantageously say a 200 degree arc, around the circumference of the blade support section.

The extent by which the separation can be more than 90 degrees, but with which clearance can still be maintained between the bearing root bearing assembly and the actuators, is a function of the particular dimensions used in the apparatus and will not be discussed further here.

In embodiments where the point of attachment of the actuators to the blade support section is at a location distant from the blade root bearing assembly, such that clearance is not a problem, the attachment points could be located around the blade over a 200 degree arc or greater.

The purpose of the reinforced blade support section 64 is to provide a strong anchor point for the actuators 62, as well as to support the weight of the blade, by means of the actuators, when the blade is detached from the hub 50 and the blade root bearing assembly 58 is removed. This is essential as when the blade is removed from the hub it will be in a less stable configuration and will be more susceptible to buffeting or induced motion from the incident wind forces.

For this reason, an optional support or lift brace 70 can be provided in the inner circumference of the blade support section 64 for reinforcement. In this example, the support brace 70 is attached to connection points 63 on the blade support section 64 corresponding in position to that of the support shoulders 66, but on the inside circumference of the blade support section 64 rather than the outside. This is advantageous as it will be appreciated that when the blade 54 is detached from hub and supported on the actuators 62, much of the loading on the blade support section 64 will occur though the shoulders 66. Different shapes and configurations of brace 70 are of course also possible. The brace 70 can also have a lifting function as will be explained later.

Figure 7:
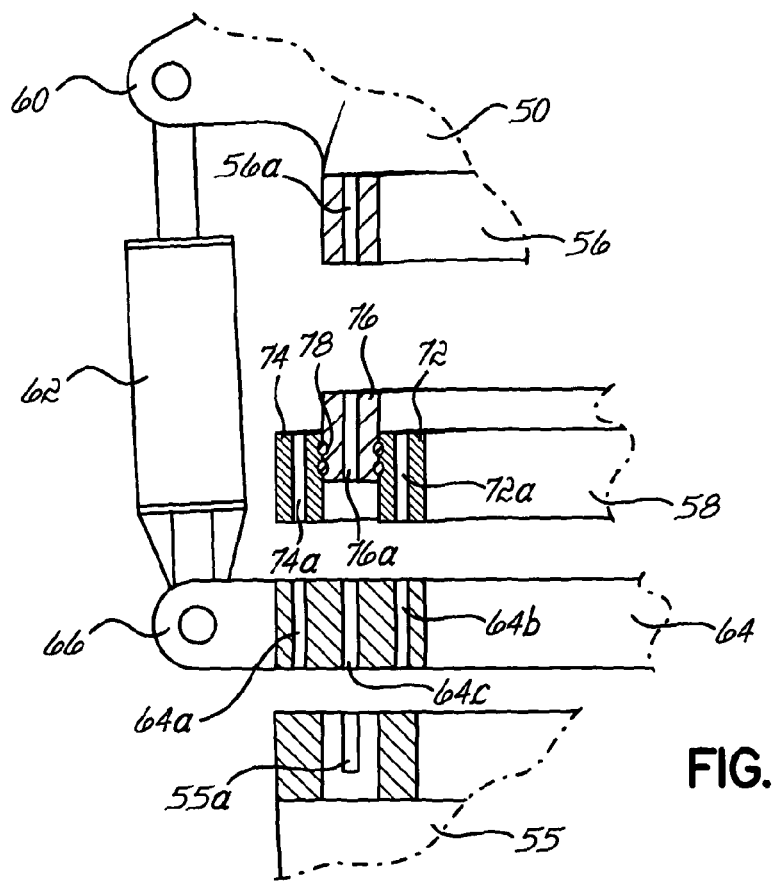
FIG. 7 is a close-up view of the connection mechanism between the hub, blade root ring bearing assembly and blade support section.

FIG. 7 to which reference should now be made illustrates in more detail how the blade root bearing assembly 58 is attached to the blade support section 64 and to the hub blade bearing ring 56 for the purposes of this example. As is known in the art, the blade root bearing assembly 58 can comprises an inner 72 and an outer bearing ring 74, and a centre bearing ring 76. The centre bearing ring 76 has a plurality of bolt holes 76a corresponding in position to opposing holes 56a on the hub blade bearing ring 56. By securing bolts or other suitable fasteners between bolt holes 76a and 56a, the centre bearing ring 76 can be secured in a fixed relationship to the hub blade bearing ring 56 and therefore the hub 50. The centre bearing ring 76 is carried in an intermediate position between inner and outer bearing rings 72 and 74 of the blade root bearing assembly 58 by a plurality of bearings 78. Thus, in normal operation of the wind turbine the centre bearing ring 76 can turn in relation to the inner and outer bearing rings 72 and 74, allowing the angular blade position or pitch relative to the hub 50 to be adjusted. The blade root bearing assembly 58 can therefore be referred to as the pitch bearing.

In alternative examples, the blade 54 and the blade support section 64 could be attached to the centre bearing ring 76, with the hub attached to the inner 72 and outer 74 bearing rings, in what is known as an inverted three ring bearing assembly. Other bearing ring assemblies and connections to the hub, such as two ring bearing assembly for example, could also be used, as will be apparent to the skilled person.

The inner and outer bearing rings 72 and 74 also have a plurality of bolt holes 72a and 74a that correspond in position to opposing bolt holes 64a and 64b. As before, using securing bolts or other suitable fasteners between bolt holes 72a and 64b, and 74a and 64a, the inner 72 and outer bearing ring 74 can be secured in a fixed relationship to the blade support section 64. The blade support section 64 is then connected to the blade body 55 by means of further bolts or fasteners connected to a further plurality of bolt holes 64c, and opposing holes 55a in a reinforced section of the blade body laminate.

The operation of the blade-hub support apparatus will now be described in more detail.

In normal operation of the wind turbine, the blade 54 is attached to the hub 50 via the blade support section 64, the blade root bearing assembly 58, and the hub blade bearing ring 56, without the actuators 62 attached. In this arrangement, the pitch of the blades 54 can be adjusted using pitch actuators known in the art, as the inner and outer bearing rings 72 and 74 attached to the blade are free to turn around the centre bearing ring 76 attached to the hub 50.

At times when the blade root bearing assembly 58 is to be replaced, an engineer working from within the hub or from the outside by means of a crane or platform, attaches a actuator to each of the support shoulders 60 and 66 on the hub and the blade support section 64. It will be appreciated that for a three blade wind turbine, a total of nine actuators will be advantageous, and in this example there are consequently nine hub support shoulders 60 on the hub. However, in practice, only one blade is likely to be worked on at a time, meaning that only three actuators will be needed for a single blade root bearing assembly replacement operation.

In order to attach the actuators, an inspection or working window in the surface of the hub 50 can be provided so that, where possible, the engineer has access to the shoulders 60 from inside the hub 50.

Once the actuators are securely attached between the hub 50 and the blade support section 64, the engineer working from within the hub ensures that the actuators are activated and take up the strain between the blade 54 and the hub 50. The engineer then undoes the bolts or fasteners that connect the centre bearing ring 76 to the hub blade bearing ring 56, and the bolts that connect the inner and outer bearing rings 72 and 74 to the blade support section 64.

The blade root bearing assembly 58 is now fully disconnected from both the hub 50 and from the blade 54, and the actuators are fully loaded with the weight of the blade 54. However, the blade root bearing assembly 58 will still be pinned in place between the blade 54 and hub 50 since the activated actuators 62 prevent the movement of the blade 54 and hub 50. The engineer therefore activates the actuators so that they extend and separate the blade 54 from the hub 50, providing clearance between them. Before doing this, the engineer preferably takes measures to secure the blade root bearing assembly 58 to the hub 50, by cables for example, so that the blade root bearing assembly 58 does not fall or slip when the blade 54 is moved.

Once the blade is supported on the hub by the actuators the blade root bearing assembly 58 can be removed and replaced as appropriate. A crane or pulley arrangement in the hub or nacelle for example can be used to provide the necessary lifting or supporting force. Once a replacement blade root bearing assembly 58 has been manoeuvred into position, the blade 54 can be reattached to the hub 50 by following the reverse of the process described above. In the reverse process, the actuators can advantageously act as a guide for ensuring that the bolt holes 76a in the new blade root bearing assembly 58, when it is attached to the blade support section 64, match up with the corresponding holes 56a in the hub blade bearing rings 56. The process can then be repeated for the other blades 54 on the hub 50 as desired, moving the actuators 62 to the appropriate shoulders 60 and 66 for working on the next blade.

Lifting or manoeuvring the blades 54 back into position against the hub can be achieved using the actuators 62, or alternatively by using a cable attached to the lifting brace 70. In this respect, the asymmetrical shape of the lifting brace 70 shown in FIG. 6 is advantageous as when used as a lifting brace for a cable winch, means that a starting tilt can be give to the blade allowing it to be more easily manoeuvred into its final position against the hub.

Figure 8:
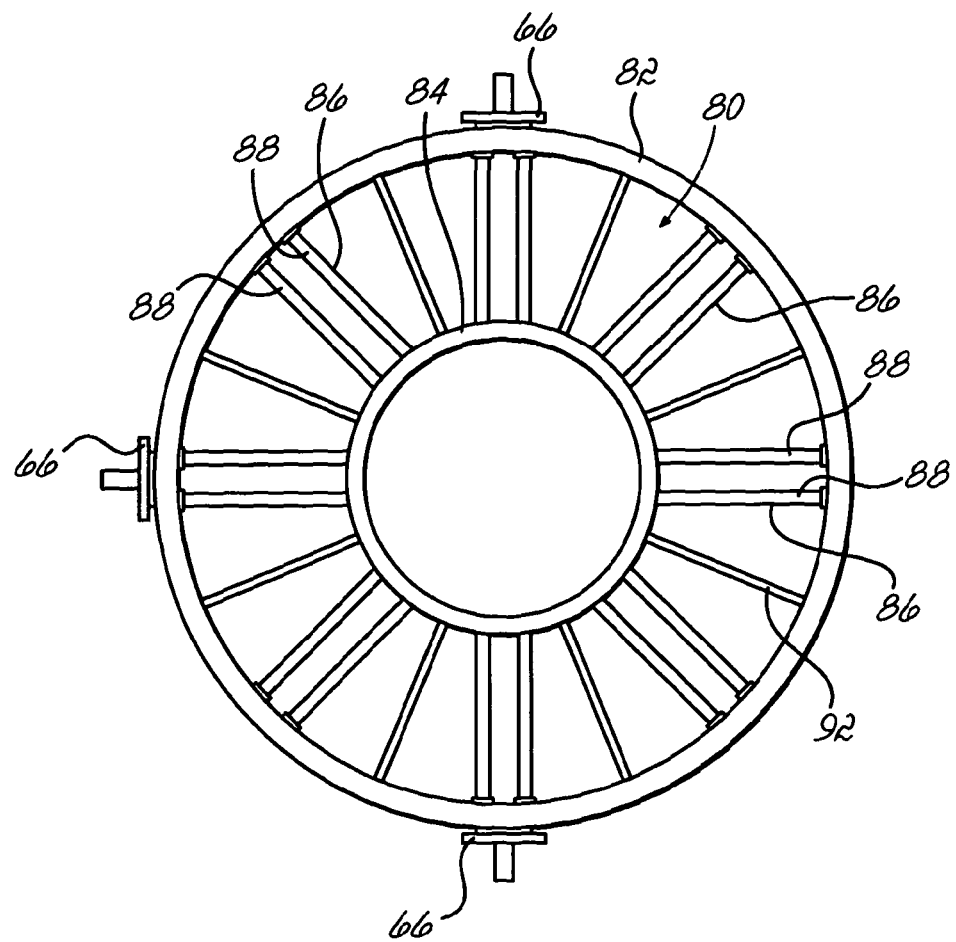
FIG. 8 illustrates a blade support section according to a second example of the invention in a top elevation view.
Figure 9:
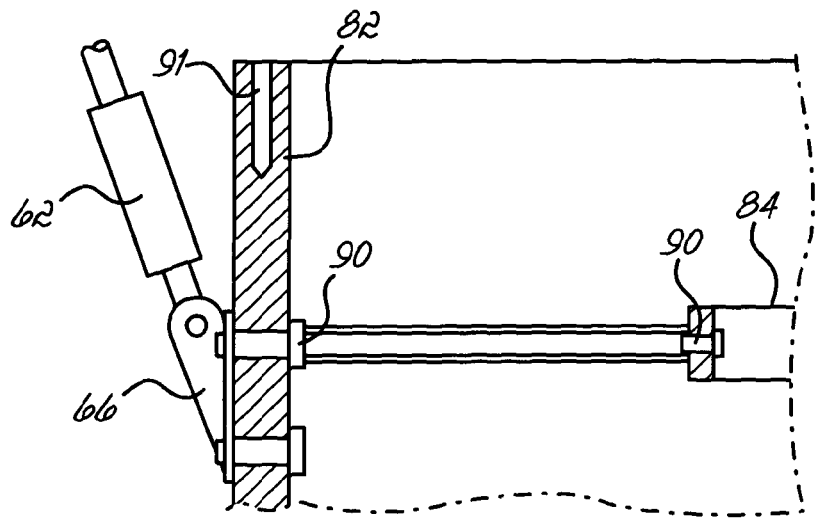
FIG. 9 illustrates a blade support section according to a second example of the invention in cross section.
Figure 10:
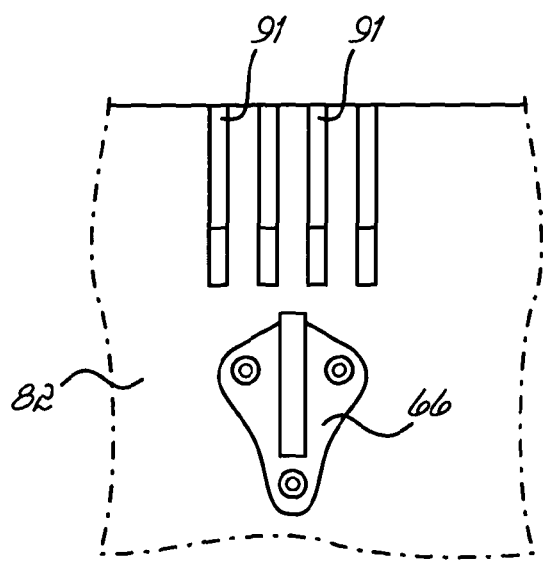
FIG. 10 illustrates a front view of an actuator attachment point according to a second example of the invention.

In the above examples of the invention, the actuators 62 are connected to the blade 54 via the blade support section 64 connected between the blade body 55 and the blade root bearing assembly 58. With reference to FIGS. 8, 9 and 10, an alternative example of the blade support section and attachment points for the actuators 62 will now be described.

In FIG. 8, a blade support section 80 is located internally of the blade outer shell 82. The blade support section comprises a reinforcing inner ring 84 of steel or other suitable material, and a plurality of reinforcing spokes 86 connected between the inner ring 84 and the blade outer shell 82. In the example shown, eight reinforcing spokes 86 are provided at radial positions, angularly spaced equally around the inner circumference of the blade, and each reinforcing spoke 86 comprises a pair of reinforcing tubular members 88. As shown in more detail in FIG. 9, the reinforcing tubular members 88, making up each reinforcing spoke 86, are connected between the inner ring 84 and the blade outer shell 82 by fasteners, such as retaining bolts.

A number of blade support shoulders 66 are mounted on the blade outer shell 82 to provide attachment points for the actuators 62. The blade support shoulders 66 are located at positions corresponding to the point at which the reinforcing tubular members 88 are coupled to the blade outer shell 82. In the example shown in FIG. 8, three blade support shoulders for supporting three actuators are shown.

The presence of the support shoulders on the blade outer shell 82, and the actuators when these are in use, place loads on the blade constructions. As a result of the placement of the shoulders 66 at positions corresponding to the reinforcing spokes 86, these loads are borne by the spokes and transmitted to the inner ring 84. As shown in FIGS. 9 and 10, the blade support shoulder 66 can be attached to the blade outer shell by fasteners or bolts 90 that are arranged coaxially with those supporting the tubular members 88. In some embodiments, the same bolts 90 may fix in place both the support shoulders 66 and the tubular members 88. In FIGS. 9 and 10, reinforced bolt holes 91 for attaching the blade outer shell 82 to a blade root flange are also shown for clarity, though these are not part of the design of the blade support section.

Additionally, one or more tie bars 92 can be mounted between the inner ring 84 and the blade outer shell 82 in order to provide cable attachment points. In this way, the blade support section can also act as the lifting brace 70 mentioned above. The tie bars 92 can be provided in between the spokes 86 or displaced either above or below for ease of access.

In alternative embodiments, an additional support ring can be provided immediately inside the blade outer shell and arranged contiguously with it. This outer support ring provides additional support and can simplify the connection of the blade support section 80 to the blade outer shell 82. In this case, the blade support shoulders 66 need not be located at positions that correspond directly to the position of the reinforcing spokes 86, but can be located anywhere around the circumference of the blade.

Other embodiments of the blade support section are also possible and are contemplated within the design. One example is a plurality of actuator support brackets located around the circumference of the blade at suitable angular positions, such as those indicated in the examples above. If required, reinforcement of the blade at these positions could then be provided by internal beams that connect one support position to another. If three actuator support shoulders 66 are provided at substantially 180 degree angular separations from one another, then the beams may be arranged in a triangular shape. If the actuator support shoulders 66 are positioned as shown in FIG. 6, then an A-shaped reinforcement frame can be provided.

By means of the apparatus and methods described above, the process of swapping a blade root bearing assembly becomes easier. However, it will be appreciated that the actuators 62 need to be capable of holding the blades 54 extremely firmly as the blade is jacked down. Without a firm hold on the blade, it will be impossible to stably hold the blade against even small wind gusts. For a 30 or more tonne blade, the actuators used should therefore perhaps provide as much as 150 tonnes of lift, though it will be appreciated that the actual figure required will vary depending on practice and the size and weight of the components used, as well as the safety factors of the replacement operation.

Although, three actuators are described in the example above, it will be appreciated that in alternative examples only one or two actuators may be used per blade, or even more than three actuators. In each case, what is most important is the stability of the support for the blade when the blade is detached from the hub, and the clearance for the blade root bearing assembly when it is removed. In the case where only a single actuator is used, stability can be improved using guide cables or tag lines connected between the blade and the tower or hub to hold it in place.

Although the actuators have been described as releasably securable actuators, it will be appreciated that in alternative examples they could be permanently attached between the blade and the hub.

Although the invention has been described with reference to carrying out repair or maintenance of a blade root bearing assembly, the invention is not limited to this as it will be appreciated that the arrangement of actuators between the hub and the blade support section allows other aspects of the blade hub interface to be worked upon.

Although the attachment points have been described as forming a blade support section, it will be appreciated that this is intended to refer only to the section of the blade where the attachment points are located, and could encompass the case where only three attachment point brackets are provided in the blade surface, either spaced equally around the circumference in a triangular arrangement, or the case in which the attachment points are located towards one side of the blade circumference only such that the ring can be considered as subscribing only a partial segment of the circumference of a circle.

Furthermore, although the examples of the invention that are described above show a three blade horizontal axis wind turbine, the invention is not limited to such wind turbines and could also be used with wind turbines having any number of blades, and also with vertical axis wind turbines.

The invention claimed is:

1. A wind turbine blade-hub support apparatus, comprising:
    a wind turbine blade comprising:
        a blade body having a blade root portion and a blade tip portion; and
        a blade support section connected to the blade root portion;
    attachment points provided on a wind turbine rotor hub, each respective attachment point corresponding to a respective attachment point on the blade support section; and
    a plurality of actuators, wherein each actuator is mounted between one of the attachment points on the rotor hub and the corresponding attachment point on the wind turbine blade, and wherein each actuator has an actuated position in which the wind turbine blade is supported in a separated position from the wind turbine rotor hub,
    wherein the separated position is a distance substantially less than the length of the wind turbine blade,
    wherein the attachment points of the blade extend outwardly of an external surface of the blade body, and
    wherein for at least one of the attachment points, the wind turbine rotor hub or the blade support section is pivotably attached to one of the plurality of actuators.

2. The apparatus of claim 1, wherein the blade support section includes an annular flange connected to the end of the blade body at the blade root portion, and wherein the blade support section has a plurality of connectors for making a secure, releasable connection to a blade root bearing assembly.

3. The apparatus of claim 2, wherein the blade support section comprises a reinforcing brace, located within a circumference of the annular flange.

4. The apparatus of claim 3, wherein the reinforcing brace comprises reinforcing members that span from one attachment point location to another within an inner circumference of the blade support section.

5. The apparatus of claim 1, wherein the blade support section comprises a plurality of attachment point brackets.

6. The apparatus of claim 5, wherein the blade support section comprises a frame member comprising a plurality of reinforcing spokes connected within an internal circumference of the blade body in the blade root portion.

7. The apparatus of claim 6, wherein the reinforcing spokes terminate at a reinforced central hub.

8. The apparatus of claim 6, wherein at least one or more of the reinforcing spokes connect to an inner surface of the blade body internally of a location where the attachment point brackets are situated.

9. The apparatus of claim 8, wherein the at least one or more of the reinforcing spokes are connected by a fastener to an attachment point bracket.

10. The apparatus of claim 6, having a reinforcing brace comprising one or more radial tie arms for providing a cable attachment point.

11. The apparatus of claim 1, wherein one side of the blade support section is left substantially free of attachment points.

12. The apparatus of claim 11, wherein all of the attachment points are located within a 180 degree arc around a circumference of the blade support section.

13. The apparatus of claim 11, wherein all of the attachment points are located within a 200 degree arc around a circumference of the blade support section.

14. The apparatus of claim 1, wherein the blade support section comprises at least three attachment points.

15. The apparatus of claim 3, wherein the reinforcing brace is positioned within the blade support section such that when a cable is attached to the reinforcing brace, the blade adopts a tilted angle with respect to a tower of the wind turbine, facilitating the connection of the blade root bearing assembly to the rotor hub of the wind turbine.

16. The apparatus of claim 1, wherein the plurality of actuators includes a hydraulic or pneumatic ram.

17. A wind turbine comprising the wind turbine blade-hub support apparatus of claim 1.

18. A wind turbine comprising the wind turbine blade-hub support apparatus of claim 1 wherein the attachment points further comprise a retaining bolt or a screw at each end of the plurality of actuators.

19. A method of replacing a blade root bearing assembly in a wind turbine, in which at least one wind turbine blade is connected to a wind turbine rotor hub via the blade root bearing assembly, the at least one wind turbine blade having a blade body with a blade root portion and a blade support section located at the blade root portion of the blade comprising attachment points for mounting a plurality of actuators between the at least one wind turbine blade and attachment points on the rotor hub of the wind turbine at which the at least one wind turbine blade is attached, wherein one side of the blade support section is left substantially free of attachment points, and wherein the attachment points of the blade extend outwardly of an external surface of the blade body, the method comprising:
- attaching the plurality of actuators between respective attachment points on the wind turbine rotor hub and on the blade support section;
- releasing a connection between the wind turbine rotor hub and the wind turbine blade root bearing assembly;
- activating the plurality of actuators to separate the wind turbine blade root bearing assembly from the wind turbine rotor hub; and
- removing the blade root bearing assembly in a direction that is generally perpendicular to the direction in which the actuator is extended through the one side of the blade support section that is left substantially free of attachment points while the blade is suspended from the rotor hub on the plurality of actuators.

20. The method of claim 19, comprising:
- activating the plurality of actuators to draw the wind turbine blade into contact with the wind turbine rotor hub such that the blade can be connected to the wind turbine rotor hub.

21. The method of claim 19, comprising drawing the wind turbine blade into contact with the wind turbine rotor hub such that the blade can be connected to the wind turbine rotor hub using a cable attached to a reinforcing brace provided for the wind turbine blade.

22. The method of claim 21, wherein the reinforcing brace is located inside the blade support section.

23. A wind turbine blade-hub support apparatus, comprising:
- a wind turbine blade comprising:
    - a blade body having a blade root portion and a blade tip portion; and
    - a blade support section connected to the blade root portion;
- attachment points provided on a wind turbine rotor hub, each respective attachment point corresponding to a respective attachment point on the blade support section; and
- a plurality of actuators, wherein each actuator is mounted between one of the attachment points on the rotor hub and the corresponding attachment point on the wind turbine blade, and wherein each actuator has an actuated position in which the wind turbine blade is supported in a separated position from the wind turbine rotor hub,
- wherein the plurality of actuators includes a hydraulic or pneumatic ram, and
- wherein the attachment points of the blade extend outwardly of an external surface of the blade body.

* * * * *